United States Patent
Nanbu et al.

(10) Patent No.: US 6,386,580 B1
(45) Date of Patent: May 14, 2002

(54) AIRBAG DEVICE AND INSTRUMENT PANEL

(75) Inventors: Yuichi Nanbu; Akifumi Takedomi, both of Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/688,337

(22) Filed: Oct. 16, 2000

(30) Foreign Application Priority Data

Oct. 22, 1999 (JP) .......................................... 11-300837

(51) Int. Cl.⁷ ............................................... B60R 21/16
(52) U.S. Cl. ..................................................... 280/732
(58) Field of Search .......................... 280/728.1, 728.2, 280/728.3, 732, 742; 102/288, 289

(56) References Cited

U.S. PATENT DOCUMENTS

| | | | | |
|---|---|---|---|---|
| 3,810,654 A | * | 5/1974 | DeBano, Jr. et al. | 280/728.1 |
| 4,153,273 A | * | 5/1979 | Risko | 280/740 |
| 5,066,039 A | * | 11/1991 | Shitanoki et al. | 280/743.1 |
| 5,072,967 A | * | 12/1991 | Batchelder et al. | 280/732 |
| 5,074,584 A | * | 12/1991 | Jarboe | 280/728.2 |
| 5,273,313 A | * | 12/1993 | Klober et al. | 280/741 |
| 5,495,807 A | * | 3/1996 | Klober et al. | 102/289 |
| 5,588,674 A | * | 12/1996 | Yoshimura et al. | 280/732 |
| 5,687,988 A | * | 11/1997 | Storey et al. | 280/728.2 |
| 5,775,724 A | * | 7/1998 | Tonooka et al. | 280/728.2 |
| 5,873,598 A | * | 2/1999 | Yoshioka et al. | 280/740 |
| 6,193,269 B1 | * | 2/2001 | Amamori | 280/728.2 |

* cited by examiner

*Primary Examiner*—Paul N. Dickson
*Assistant Examiner*—Faye M. Fleming
(74) *Attorney, Agent, or Firm*—Kanesaka & Takeuchi

(57) ABSTRACT

An airbag device is formed of an airbag, a retainer, and an inflator. The airbag is a bag-like configuration having a triangle section. The width of a front surface of the airbag and the width of mounting portions are substantially the same. The airbag is folded, but substantially not folded in the width direction, and is accommodated in the retainer. The retainer has an elongated configuration extending in the width direction of the vehicle body and thus can be installed in a long narrow space. The inflator may have an elongated and flexible body and housed in a chamber of the retainer.

6 Claims, 6 Drawing Sheets

Fig. 2
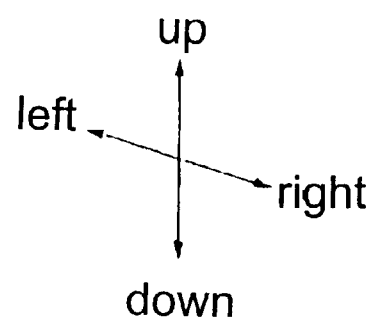
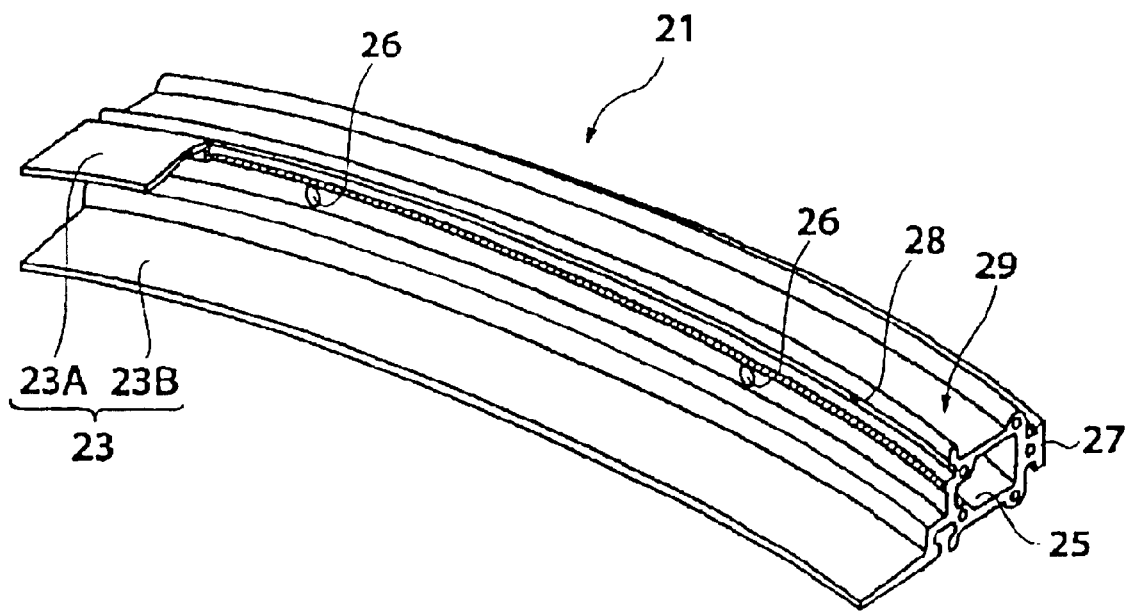

Fig. 4
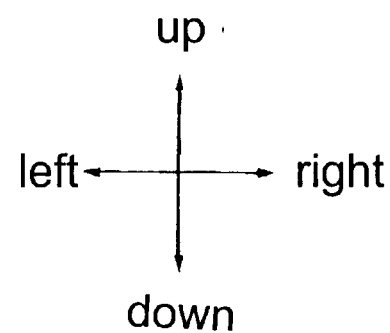
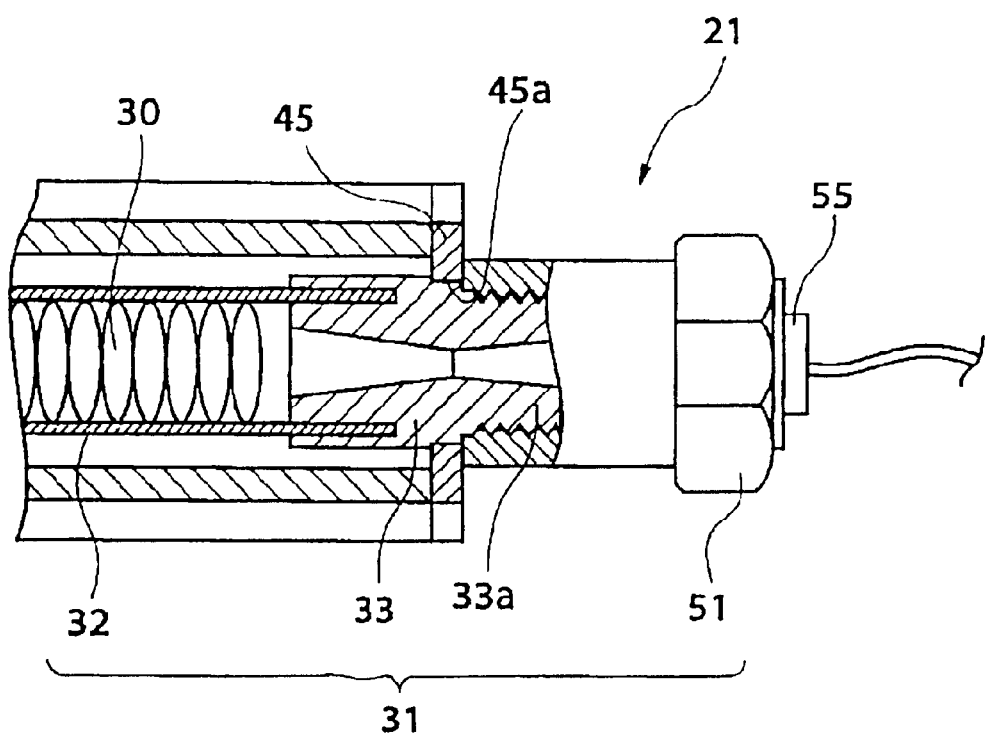

Fig. 5
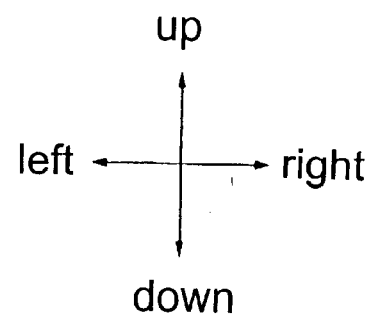
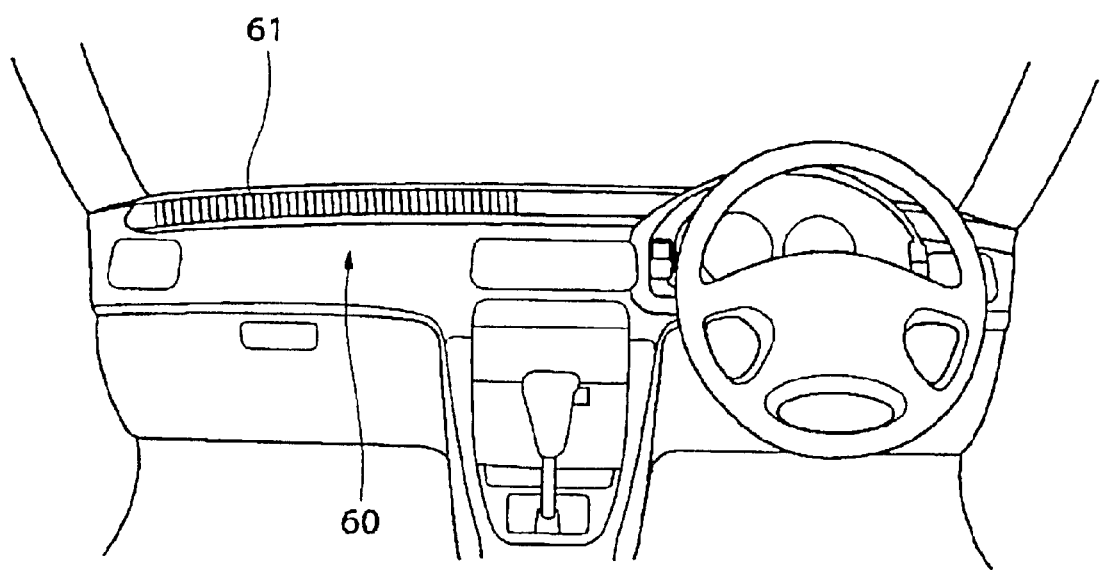

AIRBAG DEVICE AND INSTRUMENT PANEL

BACKGROUND OF THE INVENTION AND RELATED ART STATEMENT

The present invention relates to an airbag device, which is deployed to protect an occupant in the event of vehicle collision, and also relates to an instrument panel disposed in a front portion of a vehicle cabin.

Airbag devices have been employed in a variety of ways, e.g. driver airbag devices, front-passenger airbag devices, rear-passenger airbag devices, and side-impact airbag devices, in motor vehicles to protect vehicle occupants in the event of vehicle collision. An airbag device generally comprises an airbag, a retainer, an inflator, and the like. The airbag is accommodated in the folded state. The retainer is used for fixing the end of the airbag to a vehicle body. The inflator is used for generating a gas for inflating and deploying the airbag.

A front-passenger airbag device has a large-size airbag, as compared to the other types of the airbag devices, and is deployed from an instrument panel to the front of a vehicle occupant. In this type of the airbag device, the retainer is fixed to a structural beam made of a steel member of the vehicle body. The entire airbag device is housed behind the instrument panel made of resin and is located at a front portion of the vehicle cabin. At a portion of the instrument panel corresponding to the position of the airbag device, a cover having a tear line is disposed. The tear line of the cover is broken by the airbag which starts to deploy, so that the airbag can be deployed. Impact at the break of the tear line is received by the structural beam made of steel having high strength.

However, the aforementioned conventional airbag device has following problems.

The size of the airbag device is limited because the airbag device should be installed in a small space between the structural beam of the vehicle body and the instrument panel. The freedom of design is further decreased because the retainer should be fixed to the structural beam made of steel for withstanding the impact at the break of the tear line.

A configuration of a bracket disposed between the structural beam and the retainer and a configuration of the cover fitted to an opening of the instrument panel are complex. The complex configuration of the retainer constrains the dimension of a mounting portion of the airbag, so that the mounting portion of the airbag to the retainer should be reinforced.

Due to the above problems, the productivity is reduced.

The present invention has been made in view of the above problems, and an object of the present invention is to provide an airbag device, wherein design of the airbag and installation to the vehicle can be made relatively freely.

Another object of the invention is to provide an airbag device as stated above, which can be manufactured at a low cost.

A further object of the present invention is to provide an airbag device as stated above, wherein an airbag can be smoothly deployed in a shorter period of time and which can save labor for folding works.

Further objects and advantages of the invention will be apparent from the following description of the invention.

SUMMARY OF THE INVENTION

To solve the aforementioned problems, in the first aspect of the present invention, an airbag device for deploying an airbag in front of an occupant, comprises an airbag which is folded, an inflator for generating a gas for deploy the airbag, and a retainer for fixing the end of the airbag to a vehicle. The retainer has an elongated configuration extending in the right-left directions of the occupant.

The airbag device structured as mentioned above can be installed in a thin narrow space of a vehicle body member, i.e. a structural beam, or an instrument panel. Since a lid for covering the airbag device can be made with a small width, the lid may not have a tear line and may be an integral construction of a swing type. Therefore, it is not required to consider the impact strength for breaking the tear line, so that the airbag device is not necessarily fixed to a structural beam made of steel and can be fixed to an instrument panel made of resin. Accordingly, the design can be made relatively free, and the manufacturing cost is decreased.

In an airbag device of the second aspect of the present invention, an airbag device for deploying an airbag in front of an occupant comprises an airbag which is folded, an inflator for generating a gas for deploy the airbag, and a retainer for fixing the end of the airbag to a vehicle. The width in the right-left directions of a face or front surface confronting the occupant during the deployment is substantially the same as the width of the end or rear end of the airbag fixed to the retainer.

In a conventional front-passenger airbag device, the width of a mounting portion of the airbag to a retainer is normally ½ through ⅓ of the width of a front surface of the airbag, so that the load applied to the mounting portion per unit length is large, for example, 30 kgf/cm (294 N/cm). As compared to this conventional example, the load during the deployment in the airbag of the present invention should be decreased because the width of the mounting portion of the airbag to the retainer is substantially the same as the width of the front surface of the airbag. Accordingly, the strength of the mounting portion of the airbag is not required so high, thereby saving and shortening the material and the processing thereof. Alternatively, the strength of the structure for fixing the retainer is not required so high, thereby allowing the installation of the airbag device to the instrument panel.

In the third aspect of the present invention, an airbag device for deploying an airbag in front of an occupant comprises an airbag which is folded, an inflator for generating a gas for deploy the airbag, and a retainer for fixing the end of the airbag to a vehicle. The airbag is folded without substantially folding in the width direction.

Since the folding of the airbag is made in one dimension (only in the up-down directions), the deployment of the airbag can be achieved smoothly in a short period of time. In addition, it can save labor for folding works.

In the fourth aspect of the present invention, an airbag device comprises an airbag which is folded, an inflator for generating a gas for deploy the airbag, and a retainer for fixing the end of the airbag to a vehicle. The retainer has an elongated configuration extending in the width direction of the airbag, and the inflator has an elongated and flexible body.

Since the inflator can be suitably bent to fit into the retainer, it can further increase the freedom of design.

An airbag device of the fourth aspect of the present invention comprises an airbag which is folded, an inflator for generating gas for deploy the airbag, and a retainer for fixing the end of the airbag to a vehicle. The retainer further includes a chamber in which a gas generated from the inflator stays once, and a mechanism for regulating the gas flow to be supplied from the chamber to the inside of the airbag.
}

By this chamber, the deployment configuration and the deployment time of the airbag can be controlled. Further, the temperature of the gas supplied into the airbag can be lowered e.g. from 2000 to 450° C.

In the sixth aspect of the present invention, an airbag device for deploying an airbag in front of a front passenger seat of a motor vehicle, comprises an airbag which is folded, an inflator for generating a gas for deploy the airbag, and a retainer for fixing the end of the airbag to the motor vehicle. The retainer is accommodated in a groove which is formed in an instrument panel of the motor vehicle to extend in the right-left direction of the motor vehicle.

The modularization, i.e. previous assembly, of the instrument panel and the airbag device can be achieved, thereby facilitating the installation of the airbag device to the vehicle body.

In the airbag device of the present invention, a lid which is opened without tearing (not to be torn) during the deployment of the airbag can be disposed at the groove of the instrument panel.

Since the lid is opened without tearing during the deployment of the airbag, there is no need to break a tear line. Therefore, it is not required to consider the impact strength at the break of the tear line, thereby allowing the mounting structure to the vehicle body to have reduced strength. Because the width in the up-down directions of the lid can be small (e.g. width 2.5–4 cm, length 45–55 cm), there is little possibility of injuring the occupant by the swinging operation of the lid.

The inflator of the present invention generates the gas for inflating the airbag, which has an elongated and flexible body.

The inflator can be applied to an elongated airbag module, thereby improving the installation to the vehicle body.

An instrument panel of the present invention is disposed in a front portion of a vehicle cabin of a motor vehicle, and includes a groove for accommodating an airbag module which is disposed in front of a front passenger seat to extend in the right-left directions of the motor vehicle.

In the instrument panel of the present invention, a lid which is opened without tearing (not to be torn) during the deployment of the airbag can be disposed at the aforementioned groove of the instrument panel.

BRIEF DESCRIPTION OF THE DRAWINGS

FIG. 2 is a perspective view, partly in cross section, of a retainer of the airbag device shown in FIG. 1;

FIG. 4 is an enlarged cross sectional view of a part to which an initiator is mounted, taken along line 4—4 in FIG. 1;

FIG. 5 is a front view showing an appearance, taken from the inside of a vehicle cabin, of a front portion of a vehicle cabin having the instrument panel of the present invention.

DETAILED DESCRIPTION OF PREFERRED EMBODIMENTS

Figure 1:
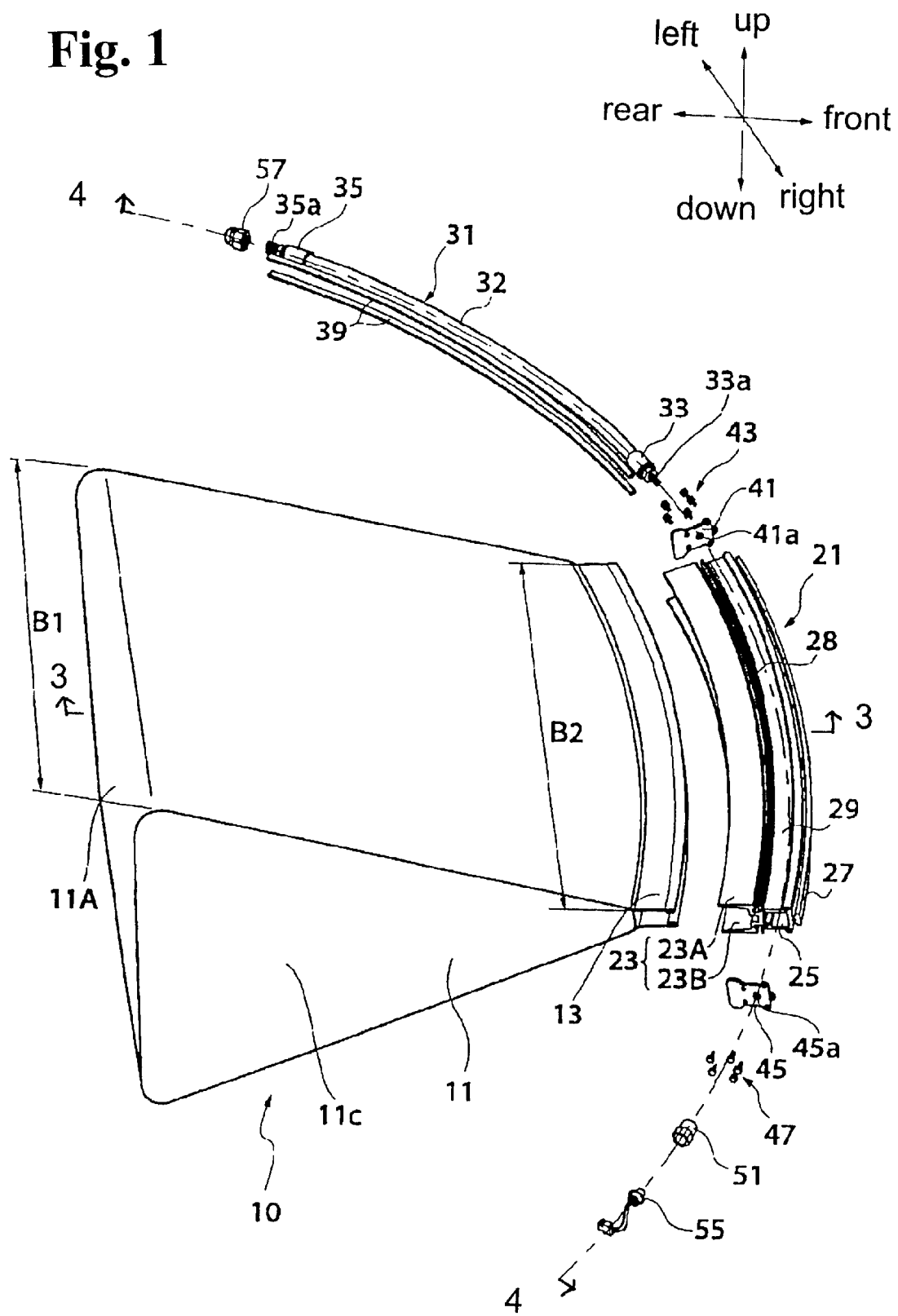
FIG. 1 is an exploded perspective view showing the structure of an airbag device according to an embodiment of the present invention.
Figure 3:
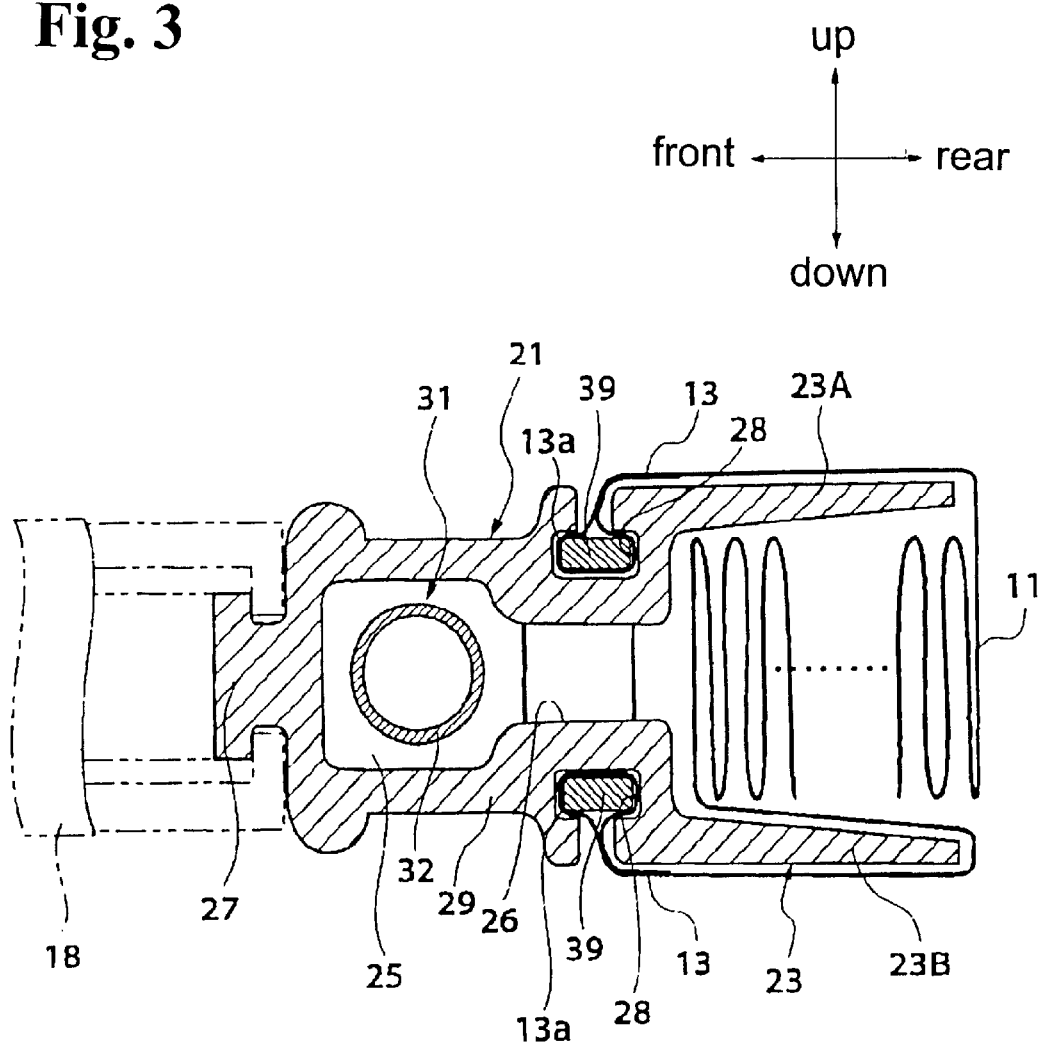
FIG. 3 is an enlarged cross sectional view of a part of a section when an airbag is not deployed, taken along line 3—3 in FIG. 1.

Hereinafter, preferred embodiments of the present invention will be described with reference to the attached drawings. FIG. 1 is an exploded perspective view showing the structure of an airbag device according to an embodiment of the present invention. FIG. 2 is a perspective view, partly in cross section, of a retainer of the airbag device shown in FIG. 1. FIG. 3 is an enlarged cross sectional view of a part of a section when an airbag is not deployed, taken along line 3—3 of FIG. 1. FIG. 4 is an enlarged cross sectional view of a part to which an initiator is mounted, taken along line 4—4 in FIG. 1.

In the drawings, arrows show directions for an occupant.

An airbag device 10 according to the present invention comprises three basic components, i.e. an airbag 11, a retainer 21, and an inflator 31.

First, description will now be made for the airbag 11.

As shown in FIG. 1, the airbag 11 is a bag-like configuration having a triangle section extending in the fore-aft directions and the up-down directions. The airbag 11 has a surface 11A facing the occupant, which is wide and has a substantially rectangular configuration. A portion of the airbag 11 away from the occupant is reduced in the up-down directions and includes a mounting portion 13 to a retainer 21. The mounting portion 13 includes a pair of upper and lower band-like portions extending in the right-left directions. In the airbag 11, the width B1 of the surface, i.e. front surface 11A, which confronts the occupant in the deployed state after the actuation of the airbag device, and the width B2 of the mounting portion 13 are substantially the same. A side surface 11c of the airbag 11 has a triangle shape, a base of which is a side of the front surface 11A.

As shown in FIG. 3, the airbag 11 is folded, but substantially not folded in the width direction, and is accommodated in the retainer 21 when the airbag device is not actuated. According to this folding manner, the folding of the airbag 11 is made in one dimension (only in the up-down directions), whereby the deployment of the airbag can be made smoothly in a short period of time at the actuation of the airbag device. In addition, it is easy to fold the airbag. The side surfaces 11c of the airbag are folded inside the airbag in the right-left directions during the folding process.

Then, the description will be made for the retainer 21.

The retainer 21 for fixing the airbag 11 to the vehicle body is made of a material, such as aluminum. As shown in FIG. 1 and FIG. 2, the retainer 21 has an elongated configuration extending in the width direction of the vehicle body, i.e. right-left directions for the occupant. Though the retainer 21 is slightly curved in this embodiment, the retainer 21 may be straight. The configuration of the retainer 21 can be selected according to the vehicle.

As best seen in FIG. 3, the retainer 21 is provided at the rear side, i.e. right side in FIG. 3, with a bag-housing portion 23. The bag-housing portion 23 comprises upper and lower flat 1o plates 23A, 23B which are in a yoke-like arrangement. The airbag 11 is folded like bellows by turning down and up, and is housed in a space defined between the flat plates 23A and 23B. The flat plates 23A, 23B extend long in the right-left directions as shown in FIG. 2.

On the other hand, the retainer 21 is provided at the front side, i.e. left side in FIG. 3, with an inflator-housing portion 29. The inflator-housing portion 29 has a cylindrical configuration, a section of which is substantially square. Formed inside the inflator-housing portion 29 is a chamber 25 in which the inflator 31 is housed. The chamber 25 is designed such that a gas generated by the inflator 31 at the actuation of the airbag device stays once in the chamber 25. As clearly shown in FIG. 2, formed in the surface at the rear side, i.e. surface at the right side in FIG. 3, of the inflator-housing portion 29 are two holes 26 allowing the communication between the inside of the chamber 25 and the space inside the bag-housing portion 23. The holes 26 also function to regulate the gas flow to be supplied from the chamber 25 to the inside of the airbag 11.

Formed on an outer surface at the front side, i.e. outer surface at the left side in FIG. 3, of the inflator-housing portion 29 is a dovetail-like anchor 27. By the anchor 27, the retainer 21 can be directly fixed to the structural beam marked by numeral 18 in FIG. 3 of the vehicle body. Alternatively, the retainer 21 may be fixed to the instrument panel as will be described with reference to FIG. 5 and FIG. 6.

Formed in the upper and lower middle portions of the retainer 21 are mounting grooves 28 for fixing the mounting portion 13 of the airbag 11. The mounting grooves 28 are formed in the outer surfaces of the upper and lower portions of the retainer 21 between the bag-housing portion 23 and the inflator-housing portion 29. The grooves 28 are each formed in a T-like configuration to have a wider portion at the inner side. The airbag 11 has envelope portions 13a along the edges of the mounting portion 13 thereof. The envelope portions 13a are accommodated in the grooves 28. Then, sticks 39 are inserted into the envelope portions 13a. That is, by fitting the sticks 39 and the mounting portion 13 into the mounting grooves 28, the bag 11 is fixed to the retainer 21. The sticks 39 are rod members having the same lengths as the retainer 21.

Hereinafter, description will be made for the inflator 31.

The inflator 31 generates a gas for deploying the airbag 11.

The inflator 31 has an elongated and flexible body 32, e.g. a high-pressure rubber hose, as shown in FIG. 1 and FIG. 3. Because of the flexibility of the body 32, the inflator 31 can be suitably bent to fit into the chamber 25 of the retainer 21. It should be noted that the body 32 may be rigid, such as a steel pipe, and be processed to have a curve corresponding to the curve of the retainer. Inside the body 32, gas generants or propellants 30 are accommodated.

Provided at both ends of the inflator body 132 are press-fittings 33, 35 with external threads, respectively, as shown in FIG. 1. The fittings 33, 35 project outside from the end faces of the retainer 21 when the inflator 31 is housed in the retainer 21. The ends of the body 32 are inserted into and connected to the fittings 33, 35 by press-fitting, respectively.

The press-fitting 33 at the right side of the inflator 31 is fixed in a manner as follows. A lid plate 45 is mounted on the end of the retainer 21 as shown in FIG. 4. The lid plate 45 has a through hole 45a for the insertion of an external thread 33a of the press-fitting 33. The lid plate 45 is fixed to the end of the retainer 21 by vises 47 (see FIG. 1).

Screwed onto the external thread 33a of the press-fitting 33 is a flanged nut 51. Held inside the nut 51 is an initiator 55 which is an igniter of the inflator 31. As the initiator 55 is ignited, the initiator 55 spouts out fire toward the propellants 30 in the body 32 through a hole of the nut 51 so as to ignite the propellants 30. By screwing the flanged nut 51, the external thread 33a of the fitting 33 and the initiator 55 are connected.

On the other hand, at the left side of the inflator 31, a lid plate 41 is mounted on the end of the retainer 21. The lid plate 41 is formed with a through hole 41a for the insertion of the external thread 35a of the press-fitting 35. The lid plate 41 is fixed to the end of the retainer 21 by vises 43 (see FIG. 1). The structures of the lid plate 41 and the vises 43 are the same as those of the lid plate 45 and the vises 47 as mentioned above. Further, a cap nut 57 is screwed onto the external thread 35a of the press-fitting 35, thereby fixing the left side of the inflator 31 to the retainer 21.

The retainer 21 of the airbag device 10 structured as mentioned above is accommodated in a groove which is formed in the instrument panel of a motor vehicle to extend in the right-left directions of the motor vehicle. At this point, it is not required to fix the retainer 21 to a structural beam of the vehicle body. The airbag device 10 can be modularized, i.e. previously integrated, with the instrument panel. By this modularization, the airbag device can be easily installed to the motor vehicle.

Now, description will be made for the actions of the airbag device 10 structured as mentioned above.

In the normal state of the motor vehicle, the airbag 11 is folded and housed in the bag-housing portion 23 of the retainer 21. As the motor vehicle comes into collision, a sensor (not shown) detects the collision to send an ignition signal to the initiator 55. Then, the initiator 55 is ignited to burn the propellants 30 inside the inflator body 32 so that the inflator 31 generates a gas. At this point, the gas are spouted out from the gas holes with the diameter of 2–3 mm formed in the body 32, without breaking the body.

The generated gas stays in the chamber 25 of the retainer 21 once and is supplied to the inside of the airbag 11 through the holes 26 and the bag-housing portion 23 of the retainer 21. The gas flow to be supplied into the airbag 11 from the chamber 25 is regulated by the holes 26. The airbag 11 is inflated by the supplied gas and is deployed into a predetermined shape.

Since the folding of the airbag 11 is made in one dimension, i.e. only in the up-down directions, the deployment of the airbag can be achieved smoothly and in a short period of time. Since the width of the mounting portion 13 of the airbag 11 is substantially the same as the width of the front surface 11a of the airbag 11, load applied to the mounting portion 13 of the airbag during the deployment per unit length can be reduced. As described in detail, the width of the mounting portion 13 of the conventional airbag 11 is ½ through ⅓ of the width of the front surface 11A of the airbag 11, so that the load applied to the mounting portion per unit length is large, for example, 30 kgf/cm (294 N/cm). As compared to this conventional example, the load during the deployment in the airbag 11 of the present embodiment should be about 15 kgf/cm (147 N/cm). Accordingly, the mounting portion 13 of the airbag 11 and the retainer 21 are not required to have large strength.

Hereinafter, description will be made for the mounting structure of the airbag device to the instrument panel according to the present invention.

Figure 6:
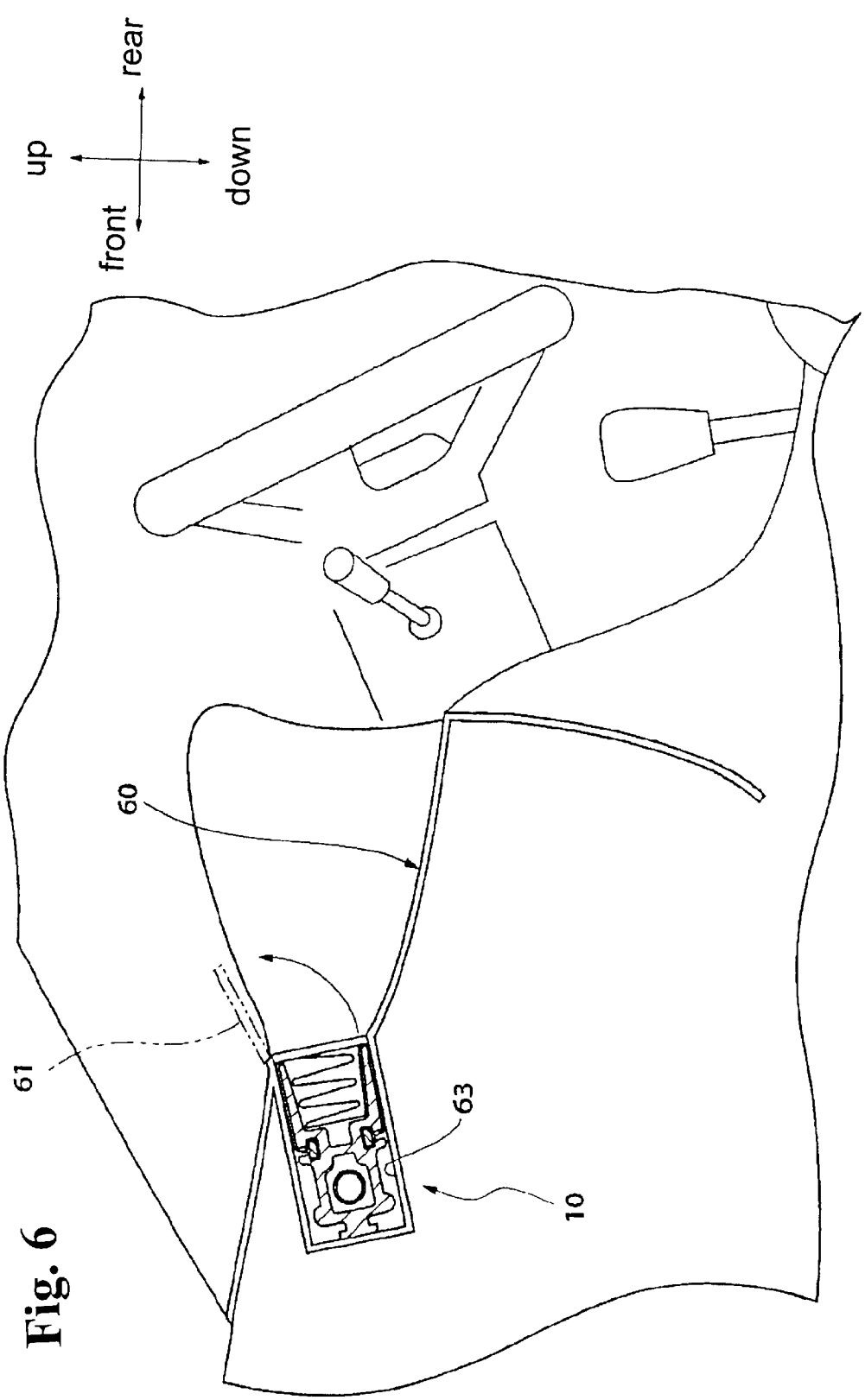
FIG. 6 is a side view, partly in cross section, of the inner structure of the front portion of the vehicle cabin.

FIG. 5 is a front view showing the appearance, taken from the inside of a vehicle cabin, of the front portion of the vehicle cabin having the instrument panel of the present invention. FIG. 6 is a side view, partly in cross section, of the inner structure of the front portion of the vehicle cabin.

The instrument panel 60 of the motor vehicle according to the embodiment is disposed at a front side of the cabin of the motor vehicle. The instrument panel 60 has a groove 63 for accommodating the airbag device 10 of the aforementioned embodiment in front of a front passenger seat of the motor vehicle. The groove 63 extends in the right-left directions inside the instrument panel 60 in front of the front passenger seat. The airbag device or module 10 is fixed to the instrument panel 60 by means of bolts or snap-on fitting. A lid 61 is disposed on a face of the groove 63 confronting the inside of the cabin in such a manner that the lid 61 can be opened and closed. The lid 61 is pressed and opened by the airbag 11 which starts to deploy when the airbag device 10 is actuated.

Since the retainer 21 of the airbag device 10 has an elongated configuration, the airbag device 10 can be installed into a narrow space, such as the groove 63. In addition, the vertical width of the lid 61 for covering the airbag device 10 can be small. By employing this lid 61 having the small vertical width, the lid 61 does not collide with an occupant when the lid 61 swings out to open. According to this structure of opening the lid 61, large force for breaking a conventional tear line is not required, so that it is not required to consider the impact strength for breaking the tear line. Therefore, the airbag device 10 can be modularized and installed in the instrument panel 60. It is not required to fix the airbag device 10 to a steel structural beam of the vehicle body as conventional manner.

A prototype of the airbag device 10 was made according to the following specifications. Then, tests were made with the prototype and good results were obtained.

Airbag:
Volume: 100 liters, Dimension of the front surface: 50 cm×60 cm, Dimension of mounting portion: 50 cm×3 cm, and Length in the fore-aft directions: 60 cm.

Retainer:
Length 50 cm×width 3 cm, Volume of inflator-housing portion: 400 cm$^3$, Number of holes: 6, and Diameter of the holes: 4 mm.

Inflator:
Inner diameter of fiber reinforced rubber hose: 20 mm, Thickness: 4 mm, Diameter of holes: 3 mm, Pitch of the holes: 50 mm, Main composition of propellant: aminotetrazole, and Weight: 120 g–160 g.

Result:
Deployment time: 0.04–0.06 seconds.

As apparent from the above description, the present invention provides the following effects.

(1) Since the retainer has the elongated configuration, the airbag device can be installed in a long narrow space. Since the lid for covering the airbag device can be made with a small width, the lid may not have a tear line and may be of a swing type and it is not required to consider the impact strength for breaking the tear line. Therefore, the design can be made relatively free, and the manufacturing cost is decreased. In addition, a particular reinforcement is not required to the mounting portion of an airbag. Furthermore, the airbag device can be installed to the instrument panel, not a steel structural beam of a vehicle body.

(2) Since the width in the right-left directions of a face, i.e. front surface, confronting an occupant when the airbag is deployed is substantially the same as the width of the end, i.e. rear end, of the airbag fixed to the retainer, the load per unit length during the deployment can be reduced. Therefore, the strength of the mounting portion of the airbag is not required so high, thereby saving and shortening the material and the process for manufacture. Alternatively, the strength of structure for fixing the retainer is not required so high, thereby allowing the installation of the airbag device to the instrument panel.

(3) Since the airbag is folded without substantially folding in the width direction, i.e. right-left directions of the occupant, the deployment of the airbag can be achieved smoothly in a short period of time. In addition, it can save labor for folding works.

(4) Since the inflator has the elongated and flexible body, the inflator can be suitably bent to fit into the retainer. Therefore, this type of inflator can be employed to various types of airbag devices.

(5) Since the chamber keeps the gas generated from the inflator once and has a mechanism for regulating the gas flow to be supplied from the chamber to the inside of the airbag, the deployment configuration and the deployment time can be controlled. Further, the temperature of the gas supplied into the airbag can be lowered.

(6) Since the retainer can be accommodated in the groove which is formed in the instrument panel of the motor vehicle to extend in the right-left directions of the motor vehicle, the modularization, i.e. previous assembly, of the instrument panel and the airbag device can be achieved, thereby facilitating the installation of the airbag device to the vehicle body.

(7) When the lid which is opened without tearing is disposed on the groove of the instrument panel, there is no need to break a tear line, so that it is not required to consider the impact strength, thereby installing the airbag more freely to the motor vehicle.

While the invention has been explained with reference to the specific embodiments of the invention, the explanation is illustrative and the invention is limited only by the appended claims.

What is claimed is:

1. An airbag device, comprising:
an airbag having a front surface confronting an occupant during a deployment, a rear end opposite to the front surface, and side surfaces located at ends in right-left directions and situated between the front surface and the rear end, said front surface having a width in the right-left directions substantially same as that of the rear end, said side surfaces during the deployment extending substantially parallel to each other and orienting perpendicular to the front surface, said airbag being folded without substantially folding the front surface in the right-left directions,
an inflator for generating a gas for deploying the airbag, and
a retainer for fixing the rear end of the airbag to a vehicle including a chamber for retaining the inflator therein, a bag housing portion situated near the chamber to be separated therefrom, and a plurality of holes communicating between the chamber and the bag housing portion.

2. An airbag device according to claim 1, wherein said retainer has an elongated configuration extending in the right-left directions of the airbag, and said inflator has an elongated and flexible body.

3. An airbag device according to claim 1, further comprising an instrument panel of the vehicle, said instrument panel having a groove extending in the right-left directions, said retainer being retained in the instrument panel.

4. An airbag device according to claim 3, further comprising a lid which is opened without tearing during the deployment of the airbag and disposed on the groove of the instrument panel.

5. An airbag device according to claim 1, wherein said airbag generally forms a triangular columnar shape during the deployment.

6. An airbag device according to claim 1, wherein said retainer is formed as one unit.

* * * * *